H. A. THOMPSON.
Metallic Socket for Shovels and Spades.
No. 213,955.          Patented April 1, 1879.
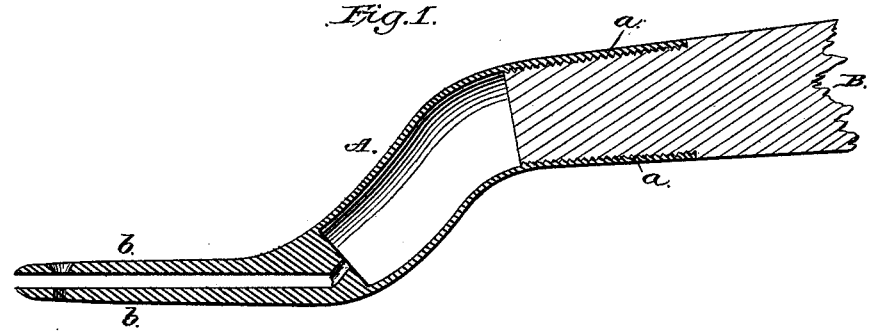
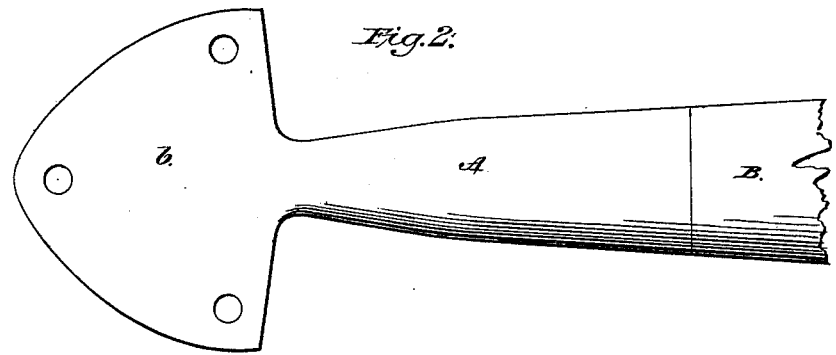
WITNESSES
INVENTOR
Henry A. Thompson
By H. J. Ennis
ATTORNEY

UNITED STATES PATENT OFFICE.

HENRY A. THOMPSON, OF FARMINGTON, MAINE.

IMPROVEMENT IN METALLIC SOCKETS FOR SHOVELS AND SPADES.

Specification forming part of Letters Patent No. 213,955, dated April 1, 1879; application filed January 31, 1879.

*To all whom it may concern:*

Be it known that I, HENRY ARTEMAS THOMPSON, of Farmington, in the county of Franklin and State of Maine, have invented certain new and useful Improvements in Metallic Sockets for Securing the Handle and Blade of Shovels or Spades; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a sectional elevation, and Fig. 2 a top-plan view, of my invention.

This invention relates to new and useful improvements in the class of shovels and spades having a metallic socket, to which the handle and blade are connected, so that they can be readily replaced by new ones when broken or worn away; and to this end the invention consists in a tubular bent metallic socket, as a new article of manufacture, provided at one end with an interior screw-thread for the reception of a wooden handle, screwed therein, and at its other end with two parallel projecting flanges, between which the blade of the shovel or spade is secured, all as will be hereinafter fully described.

In the drawings, A represents a tubular metallic socket, bent as shown in Fig. 1, and which is provided at one end with an interior screw-thread, $a$, into which the handle B screws, so that it can be readily removed and replaced by a new one, or taken out and put in at pleasure. The socket A is also provided at its other end with two parallel projecting flanges, $b\ b$, between which the blade of a shovel or spade is secured by bolts or rivets passing through said blade and the flanges, and headed in the usual manner.

My improved metallic socket, in its form and construction, combines all the essential requirements desired for said sockets—viz., special adaptability for the removal of the handle and blade, and the proper form for it to hang and work to the best advantage.

I am aware that a metallic handle-socket for a shovel bent to the curved shape required, and slotted and spread at one end to fit the surface of the blade; and also tools having a tubular socket provided with an interior screw-thread for securing a handle therein, are old, and such I do not desire to claim, broadly, as my invention; but

What I claim is—

As a new article of manufacture, the herein-described socket for shovels, consisting of the tubular metallic socket, bent as shown, and provided at one end with an interior screw-thread for the reception of a wooden handle, and at the other end with parallel projecting flanges $b\ b$, between which the blade of a shovel is secured, as specified.

In testimony that I claim the foregoing as my own I affix my signature in presence of two witnesses.

HENRY A. THOMPSON.

Witnesses:
DAVID H. CHANDLER,
B. A. HIGGINS.